United States Patent Office 3,426,127
Patented Feb. 4, 1969

3,426,127
2-OXO-TETRAHYDROFURANYL COMPOUNDS IN INSECTICIDAL COMPOSITIONS AND METHODS
Joseph W. Baker, Kirkwood, Mo., assignor to Monsanto Company, a corporation of Delaware
No Drawing. Original application Apr. 21, 1960, Ser. No. 23,650. Divided and this application Oct. 19, 1962, Ser. No. 231,845
tion Oct. 19, 1962, Ser. No. 231,845
U.S. Cl. 424—203
Int. Cl. A01n 9/36
16 Claims This application is a division of copending application Ser. No. 23,650, filed Apr. 21, 1960.

This invention relates to new and useful 2-oxo-tetrahydrofuranyl compounds and to methods of making same. Additionally this invention relates to insecticidal compositions containing the new compounds as an active ingredient.

The new 2-oxo-tetrahydrofuranyl compounds can be more specifically termed S-(2-oxo-tetrahydrofuranyl) phosphorothioates and employing the 2-oxo-tetrahydrofuran nucleus can be represented by the structure

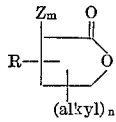

wherein $n$ is an integer from 0 to 3, inclusive; wherein the term "alkyl" means an alkyl radical containing not more than 2 carbon atoms (i.e. methyl or ethyl); wherein $m$ is an integer from 0 to 1, inclusive; wherein Z is

where R' is a hydrocarbon radical free of non-benzenoid unsaturation and containing up to 6 carbon atoms (e.g. phenyl, cyclohexyl, cyclopentyl, methyl, ethyl, propyl, butyl, amyl, and hexyl radicals and the various isomeric forms thereof); wherein the sum of $m$ and $n$ is an integer from 0 to 3, inclusive; and wherein R is

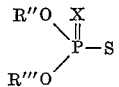

wherein R" and R''' are lower alkyl radicals or lower alkoxyalkyl radicals containing not more than 5 carbon atoms (e.g. methyl, ethyl, propyl, butyl, amyl, and the various isomeric forms thereof, and 2-methoxyethyl, 2-(ethoxy)ethyl, 2-(isopropoxy)ethyl, 3-methoxypropyl, 3-(ethoxy)propyl, 4-methoxybutyl, and the various isomeric forms thereof) and wherein X is a chalkogen of atomic weight less than 40 (i.e. sulfur or oxygen).

The new compounds of this invention can be prepared by reacting a salt (that is ammonium or alkali metal such as sodium, potassium or lithium salts) of a phosphorothioic acid of the structure

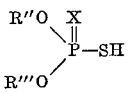

wherein R", R''', and X have the aforedescribed significance with a substantially equimolecular proportion of a halide of a 2-oxo-tetrahydrofuran of the structure

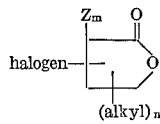

wherein $n$, "alkyl," Z and $m$ have the aforedescribed significance and wherein "halogen" means a halogen having an atomic number above 9 but not higher than 35 (i.e. chlorine or bromine but preferably chlorine) in the presence of an inert organic liquid or solvent (e.g. acetone, butanone, dioxane, benzene, toluene, xylene, etc.).

As illustrative of the compounds of this invention is the following:

S-(2-oxo-tetrahydrofuran-3-yl) O,O-dimethyl phosphorothioate
S-(2-oxo-tetrahydrofuran-3-yl) O,O-dimethyl phosphorodithioate
S-(2-oxo-tetrahydrofuran-4-yl) O,O-dimethyl phosphorothioate
S-(2-oxo-tetrahydrofuran-5-yl) O,O-dimethyl phosphorodithioate
S-(2-oxo-tetrahydrofuran-3-yl) O,O-diethyl phosphorothioate
S-(2-oxo-tetrahydrofuran-3-yl) O,O-diisopropyl phosphorodithioate
S-(2-oxo-tetrahydrofuran-4-yl) O,O-diethyl phosphorothioate
S-(2-oxo-tetrahydrofuran-4-yl) O,O-diisoamyl phosphorodithioate
S-(5-methyl-2-oxo-tetrahydrofuran-5-yl) O,O-diethyl phosphorothioate
S-(3,3,5-trimethyl-2-oxo-tetrahydrofuran-4-yl) O,O-dimethyl phosphorodithioate
S-(3,3,4-trimethyl-2-oxotetrahydrofuran-4-yl) O,O-dimethyl phosphorodithioate
S-(3-acetyl-2-oxo-tetrahydrofuran-3-yl) O,O-dimethyl phosphorodithioate
S-(3-acetyl-2-oxo-tetrahydrofuran-3-yl) O,O-diethyl phosphorodithioate
S-(3-benzoyl-2-oxo-tetrahydrofuran-3-yl) O,O-diethyl phosphorothioate
S-(3-propionyl-2-oxo-tetrahydrofuran-3-yl) O,O-diethyl phosphorodithioate
S-(3,3-dimethyl-2-oxo-tetrahydrofuran-4-yl) O,O-diethyl phosphorothioate
S-(5-methyl-3-acetyl-2-oxo-tetrahydrofuran-3-yl) O,O-diethyl phosphorodithioate
S-(3-acetyl-2-oxo-tetrahydrofuran-3-yl) O,O-di[2-(ethoxy)ethyl] phosphorothioate
S-(3-benzoyl-2-oxo-tetrahydrofuran-3-yl) O,O-di(2-methoxyethyl) phosphorothioate As illustrative of the preparation of the compounds of this invention is the following:

EXAMPLE I

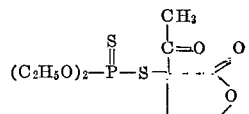

To a suitable reaction vessel equipped with a thermometer, agitator and reflux condenser is charged approximately 88 parts by weight of benzene, approximately 27.5 parts by weight (substantially 0.135 mole) of ammonium O,O-diethyl phosphorodithioate, and approximately 21.0 parts by weight (substantially 0.13 mole) of 3-chloro-3-acetyl-2-oxo-tetrahydrofuran or [2-chloro-2-(hydroxyethyl)-acetoacetic acid, gamma lactone]. The so-charged mass is then heated for 4 hours at the reflux temperature. The reaction mass is then cooled to room temperature and then filtered. The so-cooled reaction mass is then washed first with 5% aqueous sodium carbonate and then with water. The so-washed organic solution is then subjected to vacuum distillation to remove the benzene. The residue, an amber liquid, is S-(3-acetyl-2-oxo-tetrahydrofuran-3-yl) O,O-diethyl phosphorodithioate which is soluble in acetone and chloroform but insoluble in water.

*Analysis.*—Theory 9.9% P. Found 9.9% P.

EXAMPLE II

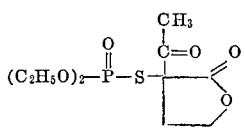

To a suitable reaction vessel equipped with a thermometer, agitator and reflux condenser is charged approximately 80 parts by weight of acetone, approximately 14.0 parts by weight (substantially 0.075 mole) of ammonium O,O-diethyl phosphorothioate and approximately 10.4 parts by weight (substantially 0.064 mole) of 3-chloro-3-acetyl-2-oxo-tetrahydrofuran. The mix is then refluxed for 3 hours, cooled to room temperature and filtered. The filtrate is then subjected to vacuum distillation to remove the acetone. The residue is then taken up with methylene chloride and the organic solution washed with water. The so-washed organic solution is then subjected to vacuum distillation to remove the methylene chloride. The residue (14.5 parts by weight), an amber liquid, is S-(3-acetyl-2-oxo-tetrahydrofuran-3-yl) O,O-diethyl phosphorothioate which is soluble in ethanol and benzene but insoluble in water.

EXAMPLE III

Employing the procedure of Example I but replacing ammonium O,O-diethyl phosphorodithioate with an equimolar amount of sodium O,O-dimethyl phosphorodithioate there is obtained S-(3-acetyl-2-oxo-tetrahydrofuran-3-yl) O,O-dimethyl phosphorodithioate, an oil, which is soluble in acetone, chloroform and ethanol but insoluble in water.

EXAMPLE IV

Employing the procedure of Example I but replacing ammonium O,O-diethyl phosphorodithioate with an equimolar amount of potassium O,O-diisopropyl phosphorodithioate there is obtained S-(3-acetyl-2-oxo-tetrahydrofuran-3-yl) O,O-diisopropyl phosphorodithioate, an oil, which is soluble in acetone, chloroform and ethanol but insoluble in water.

EXAMPLE V

Employing the procedure of Example II but replacing 3-chloro-3-acetyl-2-oxo-tetrahydrofuran with an equimolar amount of 3-chloro-3-isobutyryl-2-oxo-tetrahydrofuran there is obtained S-(3-isobutyryl-2-oxo-tetrahydrofuran-3-yl) O,O-diethyl phosphorothioate which oily material is water-insoluble.

EXAMPLE VI

To a suitable reaction vessel equipped with a thermometer, agitator and reflux condenser is charged approximately 135 parts by weight of benzene, approximately 30.5 parts by weight (substantially 0.15 mole) of ammonium O,O-diethyl phosphorodithioate, and approximately 24.7 parts by weight (substantially 0.15 mole) of 3-bromo-2-oxo-tetrahydrofuran or (alpha bromo-gamma-butyrolacetone). The charge is refluxed for 4 hours, cooled to room temperature and filtered. The filtrate is then washed first with 5% aqueous sodium carbonate and then with water. The so-washed organic solution is then subjected to vacuum distillation to remove the benzene. The residue, 45.2 parts by weight of a yellow oil, is S-(2-oxo-tetrahydrofuran-3-yl) O,O-diethyl phosphorodithioate,

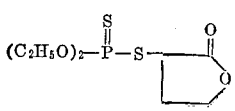

which is soluble in acetone, ethanol and ethyl acetate but insoluble in water.

*Analysis.*—Theory 11.5% P. Found 11.1% P.

EXAMPLE VII

Employing the procedure of Example VI but replacing ammonium O,O-diethyl phosphorodithioate with an equimolar amount of ammonium O,O-diethyl phosphorothioate there is obtained S-(2-oxo-tetrahydrofuran-3-yl) O,O-diethyl phosphorothioate,

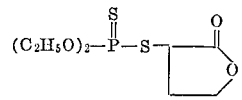

an oil which is soluble in acetone but insoluble in water.

EXAMPLE VIII

Employing the procedure of Example VI but replacing 3-bromo-2-oxo-tetrahydrofuran with an equimolar amount of 4-chloro-2-oxotetrahydrofuran there is obtained S-(2-oxo-tetrahydrofuran-4-yl) O,O-diethyl phosphorodithioate,

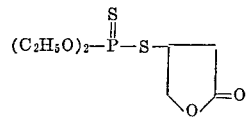

which is an oil which is soluble in acetone but insoluble in water.

EXAMPLE IX

Employing the procedure of Example VI but replacing 3-bromo-2-oxo-tetrahydrofuran with an equimolecular amount of 5-chloro-5-methyl-2-oxo-tetrahydrofuran there is obtained S-(5-methyl-2-oxo-tetrahydrofuran-5-yl) O,O-diethyl phosphorodithioate,

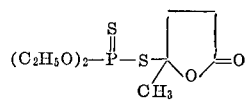

which is an oil soluble in chloroform but insoluble in water.

EXAMPLE X

Employing the procedure of Example VI but replacing ammonium O,O-diethyl phosphorodithioate with an equimolar amount of ammonium O,O-dimethyl phosphorodithioate there is obtained S-(2-oxo-tetrahydrofuran-3-yl) O,O-dimethyl phosphorodithioate, an oil, which is soluble in acetone but insoluble in water.

EXAMPLE XI

Employing the procedure of Example I but replacing ammonium O,O-diethyl phosphorodithioate with an equimolar amount of potassium O,O-diisopropyl phosphorodithioate there is obtained S-(3-acetyl-2-oxo-tetrahydrofuran-3-yl) O,O-diisopropyl phosphorodithioate, an oil, which is soluble in chloroform and acetone but insoluble in water.

EXAMPLE XII

Employing the procedure of Example I but replacing 3-chloro-3-acetyl-2-oxo-tetrahydrofuran with an equimolar amount of 3-chloro-3-benzoyl-2-oxo-tetrahydrofuran there is obtained S-(3-benzoyl-2-oxo-tetrahydrofuran-3-yl) O,O-diethyl phosphorodithioate, an oil, which is soluble in acetone and chloroform but insoluble in water.

EXAMPLE XIII

Employing the procedure of Example VI but replacing ammonium O,O-diethyl phosphorodithioate with an equimolar amount of O,O-di(2-methoxyethyl) phosphorodithioate there is obtained S-(2-oxo-tetrahydrofuran-3-yl)

O,O-di(2-methoxyethyl) phosphorodithioate, an oil which is soluble in ethanol and butanone.

The methods by which the phosphorothioates of this invention are isolated will vary slightly with the reactants employed and the product produced. Further purification by selective solvent extraction or by absorptive agents such as activated carbon or clays can precede the removal of the inert organic liquid or solvent. Additionally an inert organic solvent can be added to and in the purification by absorptive agents. However, the product is generally satisfactory for insecticidal purposes without further purification.

The preferred phosphorothioates of this invention for insecticidal and particularly miticidal purposes are S-(2-oxo-tetrahydrofuran - 3 - yl) phosphorodithioates of the structure

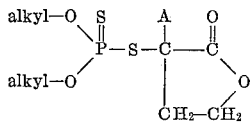

wherein A is hydrogen or acetyl, i.e.

and wherein the term "alkyl" means an alkyl radical containing from 1 to 2 carbon atoms (i.e. methyl or ethyl). These materials are not phytotoxic which property is characteristic of the compounds of this invention.

It will be understood that the terms "insect" and "insecticide" unless otherwise modified are used herein in their broad common usage to include spiders, mites, ticks, and like pests which are not in the strict biological sense classed as insects. Thus, the usage herein conforms to the definitions provided by Congress in Public Law 104, the "Federal Insecticide, Fungicide, and Rodenticide Act" of 1947, Section 2, subsection *h*, wherein the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, and wood lice.

The phosphorothioates of this invention are effective against a wide variety of insect pests. As illustrative of the activity but not limitative thereof is the following:

One gram of S-(3-acetyl-2-oxo-tetrahydrofuran-3-yl) O,O-diethyl phosphorodithioate was dissolved in sufficient acetone to make a concentrate solution thereof. Approximately 0.1 cc. of sorbitan monolaurate polyoxyethylene derivative (a commercial water-soluble non-ionic emulsifying agent) is then mixed with the concentrate. To this mixture and with agitation is added sufficient water to provide an aqueous emulsion having a concentration of 0.1% by weight of S-(3-acetyl-2-oxo-tetrahydrofuran-3-yl) O,O-diethyl phosphorodithioate. Thereupon lima bean plant leaves previously infested with the two spotted spider mite, Tetranychus telarius (L.), are dipped in the aqueous emulsion, withdrawn, and set aside for observation. At the end of 48 hours a 100% kill of the mobile stage of the mite is noted. Seven days after setting the test specimen aside residual activity is confirmed, a 100% kill of both the resting stage and the ova stage being noted. Similar results against the mobile, resting and ova stages of the same mite were obtained employing S-(2-oxo-tetrahydrofuran-3-yl) O,O-diethyl phosphorodithioate at the same concentration.

Residual activity was also observed employing the compounds of this invention against the adult red flour beetle, e.g. at a concentration of 1.0% by weight S-(3-acetyl-2-oxo-tetrahydrofuran-3-yl) O,O-diethyl phosphorothioate gave a 100% kill.

Employing S-(3-acetyl - 2 - oxo-tetrahydrofuran-3-yl) O,O - diethyl phosphorodithioate at a concentration of 0.001% by weight against yellow fever mosquito larvae, Aedes, aegypti, 100% kill is observed.

Systemic activity was also observed against a wide variety of insects. For example against the two spotted spider mite, Tetranychus telarius, a 100% kill is observed employing S-(3-acetyl-2-oxo-tetrahydrofuran-3-yl) O,O-diethyl phosphorodithioate at a concentration of 0.01% by weight.

Although the phosphorothioates of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the phosphorothioates of this invention are dispersed, it means that the particles of the phosphorothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the phosphorothioates of this invention in a carrier such as dichloro-difluoromethane and like fluorochloroalkanes which boil below room temperature at atmospheric pressure.

In the instant specification and appended claims it is to be understood that the expression "extending agent" includes any and all of those substances in which the phosphorothioates of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the phosphorothioates of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g. as in solutions, suspensions, emulsions, or aerosols) the concentration of the phosphorothioate employed to supply the desired dosage generally will be in the range of 0.001 to 50 percent by weight. When the extending agent is a semi-solid or solid, the concentration of the phosphorothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared insecticidal spray or particulate solid. In such a concentrate composition, the phosphorothioate generally will be present in a concentration of 5 to 95 percent by weight, the residue being any one or more of the well-known insecticidal adjuvants, such as the various surface active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the phosphorothioates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., at atmospheric pressure and having a flash point above about 80° F., particularly kerosene), mineral oils having an unsulfontable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the phosphorothioates of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The phosphorothioates of this invention are preferably supplied to the insect pests or to the environment of the insect pests in the form of emulsions or suspensions. Emulsions or suspensions are prepared by dispersing the phosphorothioate of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition page 280). These surfactants include the well-known capillary-active substances which may be anion-active (or anionic), cation active (or cationic), or non-ionizing (or non-ionic) which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued Aug. 5, 1958). In general it is preferred that a mixture of water-soluble anionic and water-soluble non-ionic surfactants be employed.

The phosphorothioates of this invention can be dispersed by suitable methods (e.g., tumbling or grinding) in solid extending agents either of organic or inorganic nature and supplied to the insect pest environment in particulate form. Such solid materials include for example, tricalcium phosphate, calcium carbonate, kaolin, bole, kieselguhr, talc, bentonite, fuller's earth, pyrophillite diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for insecticidal purposes in the dry form, or, by addition of water-soluble surfactants or wetting agents the dry particulate solids can be rendered wettable by water so as to obtain stable aqueous dispersions or suspensions suitable for use as sprays.

For special purposes the phosphorothioates of this invention can be dispersed in a semi-solid extending agent such as petrolatum or soap (e.g., sodium stearate or oleate or palmitate or mixtures thereof) with or without the aid of solubility promotors and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of phosphorothioates of this invention with a water-soluble surfactant which lowers the surface tension of water in the weight proportions of 0.1 to 15 parts of surfactant with sufficient of the phosphorothioate of this invention to make 100 parts by weight. Such a concentrate is particularly adapted to be made into a spray for combatting various forms of insect pests (particularly mites) by the addition of water thereto. As illustrative of such a concentrate is an intimate mixture of 95 parts by weight of S-(3-acetyl-2-oxo-tetrahydrofuran-3-yl) O,O-diethyl phosphorodithioate and 5 parts by weight of a water-soluble non-ionic surfactant such as the polyoxyethylene derivative of sorbitan monolaurate.

Another useful concentrate adapted to be made into a spray for combatting insect pests (particularly mites) is a solution (preferably as concentrated as possible) of a phosphorothioate of this invention in an organic solvent therefor. The said liquid concentrate preferably contains dissolved therein a minor amount (e.g., 0.5 to 10 percent by weight of the weight of the new insecticidal agent) of a surfactant (or emulsifying agent), which surfactant is also water-soluble. As illustrative of such a concentrate is a solution of S-(3-acetyl-2-oxo-tetrahydrofuran-3-yl) O,O-diethyl phosphorodithioate in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides such as mannitan or sorbitan.

In all of the various dispersions described hereinbefore for insecticidal purposes, the active ingredients can be one or more of the compounds of this invention. The compounds of this invention can also be advantageously employed in combination with other pesticides, including, for example, nematocides, bacterocides, and herbicides. In this manner it is possible to obtain mixtures which are effective against a wide variety of pests and other forms of noxious life.

In controlling or combatting insect pests the phosphorothioates of this invention either per se or compositions comprising same are supplied to the insect pests or to their environment in a lethal or toxic amount. This can be done by dispersing the new insecticidal agent or insecticidal composition comprising same in, on or over an infested environment or in, on or over an environment the insect pests frequent, e.g. agricultural soil or other growth media or other media infested with the insect pests or attractable to the pests for habitational or sustenance or propagational purposes, in any conventional fashion which permits contact between the insect pests and the phosphorothioates of this invention. Such dispersing can be brought about by applying the phosphorothioates per se or sprays or particulate solid compositions containing same to a surface infested with the insect pests or attractable to the pests, as for example, the surface of agricultural soil or other media such as the above ground surface of plants by any of the conventional methods, e.g. power dusters, broom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. An insecticidal composition comprising a phosphorothioate of the formula

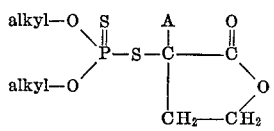

wherein A is acetyl and wherein "alkyl" means alkyl of from 1 to 2 carbon atoms dispersed in an extending agent selected from the class consisting of solid and semisolid extending agents, the composition containing 0.1 to 25 percent by weight of said phosphorothioate.

2. An insecticidal composition comprising a phosphorothioate of the formula

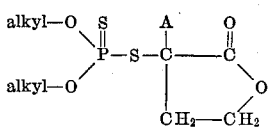

wherein A is acetyl and wherein "alkyl" means alkyl of from 1 to 2 carbon atoms dispersed in a liquid extending agent, the composition containing 0.001 to 50 percent by weight of said phosphorothioate.

3. An insecticidal composition comprising a phosphorothioate of the formula

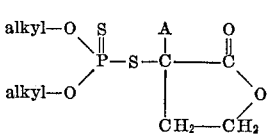

wherein A is acetyl and wherein "alkyl" means alkyl of from 1 to 2 carbon atoms dispersed in an adsorbent clay, the composition containing 0.1 to 25 percent by weight of said phosphorothioate.

4. An insecticidal concentrate comprising a phosphorothioate of the formula

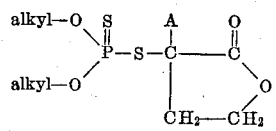

wherein A is acetyl and wherein "alkyl" means alkyl of from 1 to 2 carbon atoms and an insecticidal adjuvant, said concentrate containing from 5 to 95 percent by weight of said phosphorothioate.

5. An insecticidal concentrate comprising a phosphorothioate of the formula

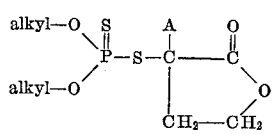

wherein A is acetyl and wherein "alkyl" means alkyl of from 1 to 2 carbon atoms dispersed in an organic solvent therefor and having dissolved therein a minor amount of a surfactant, said concentrate forming an emulsion with water upon agitation therewith.

6. An insecticidal concentrate adapted to be made into a sprayable composition by the addition of water comprising a phosphorothioate of the formula

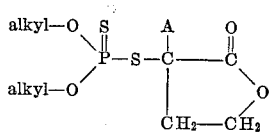

wherein A is acetyl and wherein "alkyl" means alkyl of from 1 to 2 carbon atoms in admixture with a water-soluble surfactant in the weight proportion of 0.1 to 15 parts of surfactant and sufficient of said phosphorothioate to make 100 parts by weight.

7. The method of controlling insects which comprises contacting the insects with a toxic amount of a compound of the formula

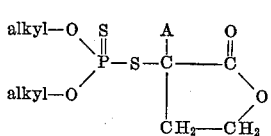

wherein A is acetyl and wherein "alkyl" means alkyl of from 1 to 2 carbon atoms.

8. The method of controlling insects which comprises contacting the insects with a toxic amount of S-(3-acetyl-2-oxo-tetrahydrofuran-3-yl) O,O-diethyl phosphorodithioate.

9. The method for protection of plants against insect attack which comprises applying to the plant an insecticidal amount of S-(3-acetyl-2-oxo-tetrahydrofuran-3-yl) O,O-diethyl phosphorodithioate.

10. An insecticidal concentrate comprising 5 to 95 percent by weight of S-(3-benzoyl-2-oxo-tetrahydrofuran-3-yl) O,O-diethyl phosphorothioate and an insecticidal adjuvant.

11. An insecticidal concentrate comprising 5 to 95 percent by weight of S-(3-propionyl-2-oxo-tetrahydro-furan-3-yl) O,O-diethyl phosphorodithioate and an insecticidal adjuvant.

12. An insecticidal concentrate comprising 5 to 95 percent by weight of S-(5-methyl-3-acetyl-2-oxo-tetrahydrofuran-3-yl) O,O-diethyl phosphorodithioate and an insecticidal adjuvant.

13. An insecticidal concentrate comprising 5 to 95 percent by weight of S-(3-acetyl-2-oxo-tetrahydrofuran-3-yl) O,O-di[2-(ethoxy)ethyl] phosphorothioate and an insecticidal adjuvant.

14. An insecticidal concentrate comprising 5 to 95 percent by weight of S-(3-benzoyl-2-oxo-tetrahydrofuran-3- yl) O,O-di(2-methoxyethyl) phosphorothioate and an insecticidal adjuvant.

15. An insecticidal concentrate comprising 5 to 95 percent by weight of S-(3-acetyl-2-oxo-tetrahydrofuran-3-yl) O,O-diisopropyl phosphorodithioate and an insecticidal adjuvant.

16. An insecticidal concentrate comprising 5 to 95 percent by weight of S-(3-isobutyryl-2-oxo-tetrahydrofuran-3-yl) O,O-diethyl phosphorothioate and an insecticidal adjuvant.

References Cited

FOREIGN PATENTS 510,817  5/1952  Belgium.

ALBERT T. MEYERS, *Primary Examiner.*

V. C. CLARKE, *Assistant Examiner.*

U.S. Cl. X.R.

260—343.6; 424—45